US007184012B1

(12) United States Patent
Kim (10) Patent No.: US 7,184,012 B1
(45) Date of Patent: Feb. 27, 2007

(54) MOBILE COMMUNICATION STATION AND DISPLAY THEREIN

(75) Inventor: Hong Joo Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/633,061

(22) Filed: Aug. 4, 2000

(30) Foreign Application Priority Data

Aug. 4, 1999 (KR) ................................. 1999-32001

(51) Int. Cl.
  *G09G 3/36* (2006.01)
  *G09G 5/00* (2006.01)
  *G09G 3/04* (2006.01)
(52) U.S. Cl. ...................... 345/100; 345/1.1; 345/1.3; 345/30; 345/204
(58) Field of Classification Search .................. 345/87, 345/100, 98, 102, 103, 1.1, 1.3, 90, 901, 345/903, 30, 204; 379/88, 87; 354/55, 102; 349/56, 58; 361/681
See application file for complete search history.

(56) References Cited

U.S. PATENT DOCUMENTS

| | | | |
|---|---|---|---|
| 5,841,431 A * | 11/1998 | Simmers | |
| 5,881,299 A * | 3/1999 | Nomura et al. | |
| 5,896,575 A * | 4/1999 | Higginbotham et al. | .... 455/566 |
| 6,125,286 A * | 9/2000 | Jahagirdar et al. | .......... 455/566 |
| 6,177,917 B1 * | 1/2001 | Koizumi et al. | ............... 345/87 |
| 6,262,785 B1 * | 7/2001 | Kim | ............................. 349/58 |
| 6,297,786 B1 * | 10/2001 | Kakuta et al. | |

FOREIGN PATENT DOCUMENTS

| | | |
|---|---|---|
| JP | 59195278 A | 11/1984 |
| JP | 04323688 A | 11/1992 |
| JP | 04329516 A | 11/1992 |
| JP | 1994-037697 | 2/1994 |
| JP | 06037697 A | 2/1994 |
| JP | 06292195 A | 10/1994 |

* cited by examiner

*Primary Examiner*—Kee M. Tung
*Assistant Examiner*—Hau H. Nguyen
(74) *Attorney, Agent, or Firm*—McKenna Long & Aldridge LLP.

(57) ABSTRACT

Mobile station and display therein, in which a plurality of LCDs are made operative from one operation means for recognizing information on an originating station and information on a state of a receiver station even if a folding cover is not opened in a folder type mobile station, the mobile station including a folding cover movable between an opened position and a closed position, first display means mounted on one side of the folding cover having 'n' first signal lines and 'k' scan lines, second display means mounted on the other side of the folding cover having 'n' second signal lines and 'm–k' scan electrodes lines, and an operator for operating the first and second display means having 'm' scan electrode lines connecting the 'k' scan lines in the first display means and the 'm–k' scan lines in the second display means, and 'n' signal electrode lines connecting the first signal lines and the second signal lines, respectively.

27 Claims, 6 Drawing Sheets

MOBILE COMMUNICATION STATION AND DISPLAY THEREIN

This application claims the benefit of Korean Patent Application No. 1999-32001, filed on Aug. 4, 1999, which is hereby incorporated by reference for all purposes as if fully set forth herein.

BACKGROUND OF THE INVENTION

1. Field of the Invention

The present invention relates to a mobile communication station (mobile station), and more particularly, to a mobile station and a display therein, in which a plurality of LCDs (Liquid Crystal Displays) are made operative from one operation means for recognizing information on an originating station and information on a state of a receiver station even if a folding cover is not opened in a folding type mobile station.

2. Background of the Related Art

Figure 1:
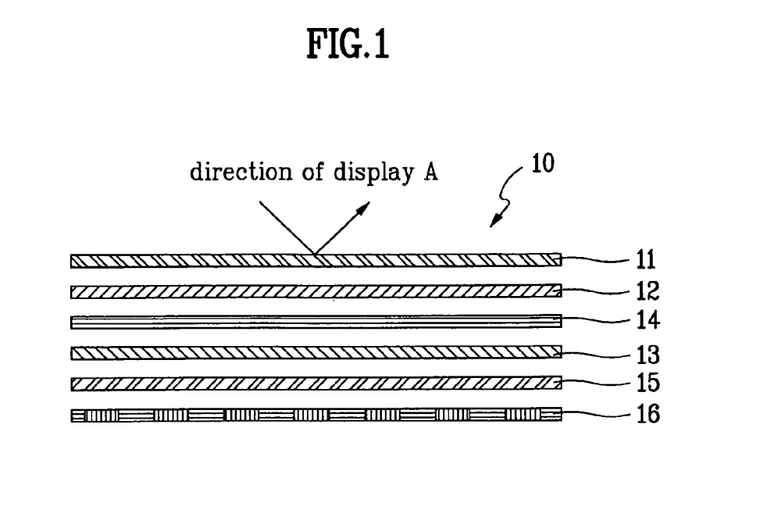
FIG. 1 illustrates a section of a related art LCD.

A related art LCD will be explained. FIG. 1 illustrates a section of a related art LCD, and FIG. 2 illustrates a block diagram of a two-faced display of LCD in a related art mobile station.

Referring to FIG. 1, the related art LCD is provided with a lower substrate 13 having a scan electrode pattern, a signal electrode pattern, and a pixel electrode pattern formed thereon, and an upper substrate 12 having a common electrode pattern, a black matrix and color filter layer, and liquid crystal 14 injected between the upper substrate 12 and the lower substrate 13. There are polarizing plates 11 and 15 on an upper surface of the upper substrate 12 and on a lower surface of the lower substrate 13, respectively, for compensating for a phase difference caused by light refraction in the course of display of characters, numerals, or figure. And, there is a reflection plate 16 on a bottom surface of the polarizing plate 15 for reflecting light in a forward direction. The upper and lower substrates 12 and 13 are formed of glass or film having very good transparency, and the electrode pattern on the upper substrate 12 and the lower substrate 13 may be of the matrix type, segment type, or a mixture of the dot matrix type and the segment type.

A device for displaying characters, numerals, or figures on two faces of the device by applying two of the foregoing LCDs to the device will be explained.

Figure 2:
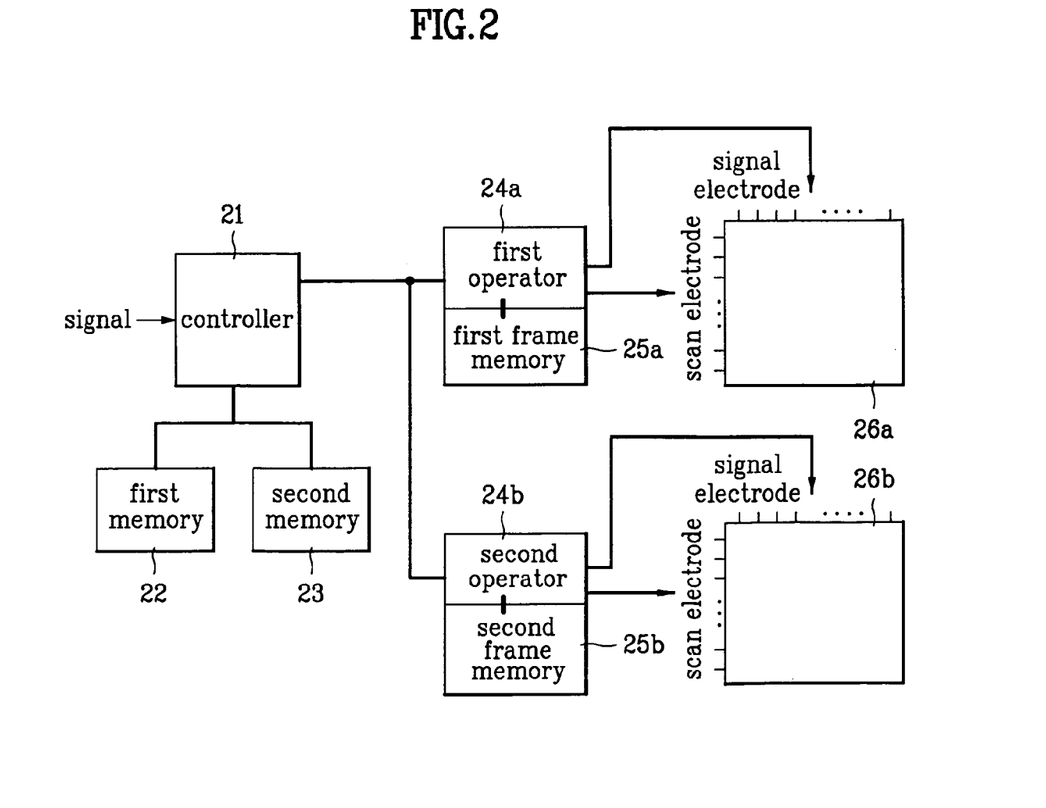
FIG. 2 illustrates a block diagram of two faced display of LCD in a related art mobile station.

Referring to FIG. 2, the device for displaying characters, numerals, or figures on two faces of the device is provided with a first and a second liquid crystal displays 26a and 26b respectively having signal lines and scan lines, a controller 21 for receiving and analyzing a video signal, to provide a control signal for displaying characters, numerals, and figures, a first memory 22, a volatile memory for temporary storage of a signal or storage of booted data for accelerating operation of the controller 21, a second memory 23, a non-volatile memory for storing a general management algorithm of the controller 21 therein, a first operator 24a for operating the signal lines and the scan lines in the first LCD 26a in response to a control signal from the controller 21 for displaying the video signal, a second operator 24b for operating the signal lines and the scan lines in the second LCD 26b in response to a control signal from the controller 21, and first and second frame memories 25a and 25b for storing signals to be used in implementing the characters, numerals, and figures provided from the controller 21 for the first and second operators 24a and 24b. That is, there are two LCDs each having separate signal lines and scan lines and two operators for operating respective LCDs.

Operation of the two faced display provided by attaching two of the foregoing LCDs on a front and back of a plane will be explained.

Upon reception of system power, the controller 21 accesses to an operation program in the second memory 23, to be in a state that an initially booted condition of the system is maintained, and detects an external signal input for displaying characters, numerals, or figures. Upon detection of reception of an external signal, the controller analyses the input signal according to the managing algorithm and analyzing algorithm stored in the first and second memories 22 and 23, and provides a control signal for displaying characters, numerals, and figures to the first and second operators 24a and 24b. Each of the first and second operators 24a and 24b provides an operating signal for displaying the characters, numerals, and figures to the scan lines and the signal lines in the first and second LCDs 26a and 26b attached on the inside and outside of a system for two faced display in response to the control signal for display from the controller 21. The first and second frame memories 25a and 25b process and store the control signals for displaying characters, numerals or figures provided for controlling display from the controller 21 in frame units, and present the signals in frame units stored in relevant memory regions in response to an access signal from the first and second operators 24a and 24b, thereby maintaining a stable display of the characters, numerals, or figures on the first and second LCDs 26a and 26b.

However, the related art two faced display has the following problems.

First, in order to display characters, numerals, and figures in two faces, two separate LCDs are required, and two corresponding operators are required for operating the two LCDs, and duplicate control algorithms are required for the two-faced display, that increases power consumption and costs.

Second, the two operators required for operating the two LCDs respectively occupy much space inside of the system, that impedes fabrication of a light weight and slim product. For example, the two LCDs required to attach to an inside and outside of the folding cover for recognition of information on an originating station, recognition of received characters, and reading time information, without opening the folding cover in a folder type mobile station, is not in line with a goal of providing a small sized and light folder type mobile station device, and increases cost due to the addition of an expensive LCD and operator.

SUMMARY OF THE INVENTION

Accordingly, the present invention is directed to a mobile station and a display therein that substantially obviates one or more of the problems due to limitations and disadvantages of the related art.

An object is to provide a mobile station and a display therein, which has a low power consumption, permits effective use of limited space and to save a production cost, permits to recognize information on an originating station, a received message, time information, and other message displayed without opening the folding cover, and to permit to provide a light weight, and slim mobile station.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purposes of the present invention, as embodied and broadly described, the mobile station includes a folding cover movable between an opened position and a closed position, first display means mounted on one side of the folding cover having 'n' first signal lines and 'k' scan lines, second display means mounted on the other side of the folding cover having 'n' second signal lines and 'm–k' scan lines, and an operator for operating the first and second display means having 'm' scan electrode lines connecting the 'k' scan lines in the first display means and the 'm–k' scan lines in the second display means, and 'n' signal lines connecting the first signal lines and the second signal lines, respectively.

In other aspect, there is provided a mobile station including a folding cover movable between an opened position and a closed position, first display means mounted on one side of the folding cover having 'n' first scan lines and 'k' signal lines, second display means mounted on the other side of the folding cover having 'n' second scan lines and 'm–k' signal lines, and an operator for operating the first and second display means having 'm' signal lines connecting the 'k' signal lines in the first display means and the 'm–k' signal lines in the second display means, and 'n' scan electrode lines connecting the first scan lines and the second scan lines, respectively.

In another aspect, there is provided a display in a mobile station including first liquid crystal display having a plurality of first signal lines defining a plurality of first pixels and a plurality of first scan lines, second liquid crystal display having a plurality of second signal lines defining a plurality of second pixels and a plurality of second scan lines, and an operator for operating the first and second liquid crystal displays having a plurality of scan electrode lines connecting the first and second scan lines, and a plurality of signal electrode lines connecting the first signal lines and the second signal lines, respectively.

In further aspect, there is provided a display in a mobile station including first liquid crystal display having a plurality of first signal lines defining a plurality of first pixels and a plurality of first scan lines, second liquid crystal display having a plurality of second signal lines defining a plurality of second pixels and a plurality of second scan electrodes lines, and an operator for operating the first and second liquid crystal displays having a plurality of signal electrode lines connecting the first and second signal lines, and a plurality of scan electrode lines connecting the first scan lines and the second scan lines, respectively.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, together with the description serve to explain the principles of the invention.

In the drawings.

DETAILED DESCRIPTION OF THE PREFERRED EMBODIMENT

Figure 3:
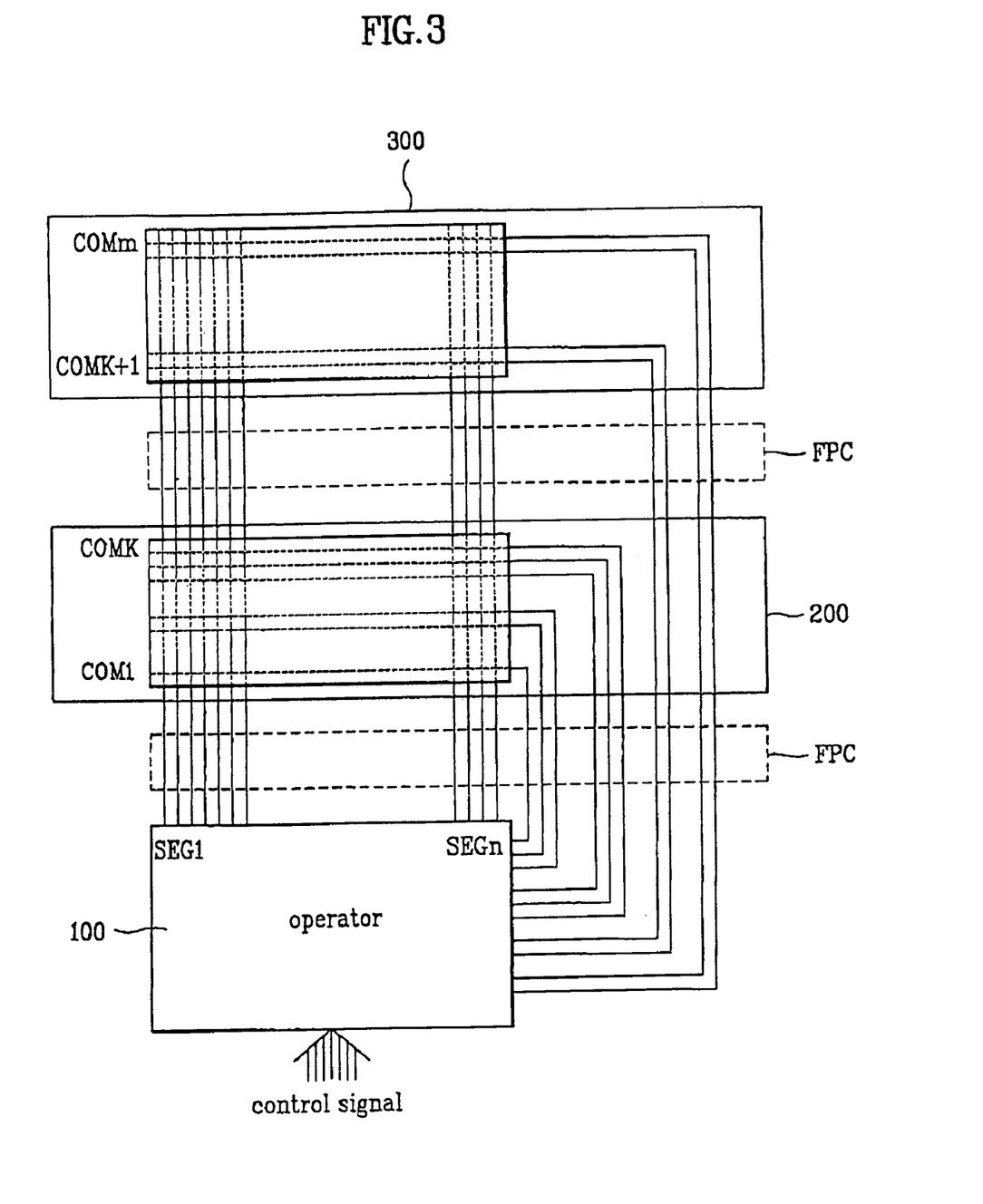
FIG. 3 illustrates a system of two LCDs connected to one operating means in accordance with a preferred embodiment.

Reference will now be made in detail to the preferred embodiments, examples of which are illustrated in the accompanying drawings. FIG. 3 illustrates a system of two LCDs connected to one operating means in accordance to a preferred embodiment.

Referring to FIG. 3, the display in a mobile station in accordance with a preferred embodiment of the present invention includes an operator 100, a first LCD 200, and a second LCD 300 with common signal electrode lines, so that the one operator 100 operates the first and second LCDs. That is, the operator 100 controls operation of 'n' signal electrode lines $SEG_1$–$SEG_n$, and 'm' scan electrode lines $COM_1$–$COM_m$, for displaying characters, numerals, and figures on the first or second LCDs 200 or 300 in response to a control signal provided from a system controller. The first LCD 200 includes 'n' signal lines connected to 'n' signal lines $SEG_1$–$SEG_n$ in the operator 100 respectively, and 'k' scan lines connected to from a first to 'k' th scan electrode lines $COM_1 COM_k$ among the 'm' scan electrode lines $COM_1$–$COM_m$, respectively. Accordingly, the first LCD 200 has n×k pixels. The second LCD 300 includes 'n' signal lines connected to 'n' signal electrode lines $SEG_1$–$SEG_n$ in the operator 100 respectively, and 'm–k' scan lines connected to from a (k+1)th to 'm' th scan electrode lines $COM_{k+1}$–$COM_m$ among the 'm' scan electrode lines $COM_1$–$COM_m$, respectively. Accordingly, the second LCD 300 has n×(m–k) pixels. The 'n' signal electrode lines have 'n' first signal electrode lines connecting the operator 100 to the 'n' signal lines in the first LCD 200, and 'n' second signal lines connecting the 'n' signal lines in the first LCD 200 to the 'n' signal lines in the second LCD 300.

Though not shown, the system may be provided such that the operator 100 operates the first and second LCDs 200 and 300 with the scan electrode lines provided in common. That is, the operator 100 controls operation of the 'n' scan electrode lines $COM_1$–$COM_n$, and 'm' signal electrode lines $SEG_1$–$SEG_m$, for displaying characters, numerals, or figures on the first or second LCD 200 or 300 in response to the control signal provided from the system controller. The first LCD 200 has 'n' scan lines connected to 'n' scan electrode lines $COM_1$–$COM_n$ in the operator 100 respectively, and 'k' signal lines connected to a first to a 'k' th signal electrode lines $SEG_1$–$SEG_k$ among the 'm' signal electrode lines $SEG_1$–$SEG_m$, respectively. Therefore, the first LCD 200 has n×k pixels. The second LCD 300 has 'n' scan electrodes lines connected to 'n' scan electrode lines $COM_1$–$COM_n$ in the operator 100 respectively, and 'm–k' signal lines connected to a 'k+1'th to a 'm' th signal electrode lines $SEG_{k+1}-SEG_m$ among the 'm' signal electrode lines $SEG_1-SEG_n$, respectively. Therefore, the second LCD 300 has n×(m–k) pixels. The 'n' scan electrode lines have 'n' first scan electrode lines connecting the operator 100 to the 'n' scan lines in the first LCD 200, and the 'n' second scan electrode lines connecting the 'n' scan lines in the first LCD 200 to the 'n' scan lines in the second LCD 300.

In the preferred embodiment of the foregoing system, the first LCD 200 has a screen greater than the second LCD 300, and, when the first LCD 200 is mounted on a mobile station on inside of a folder thereof, the first LCD 200 serves as a main screen, and the second LCD 300 is mounted on outside of the folder of the mobile station, to serve as a supplementary screen. Signal interfaces between the operator 100 and the first and second LCDs 200 and 300 (signal electrode lines and scan electrode lines) are preferably made by means of flexible wires.

Figure 4:
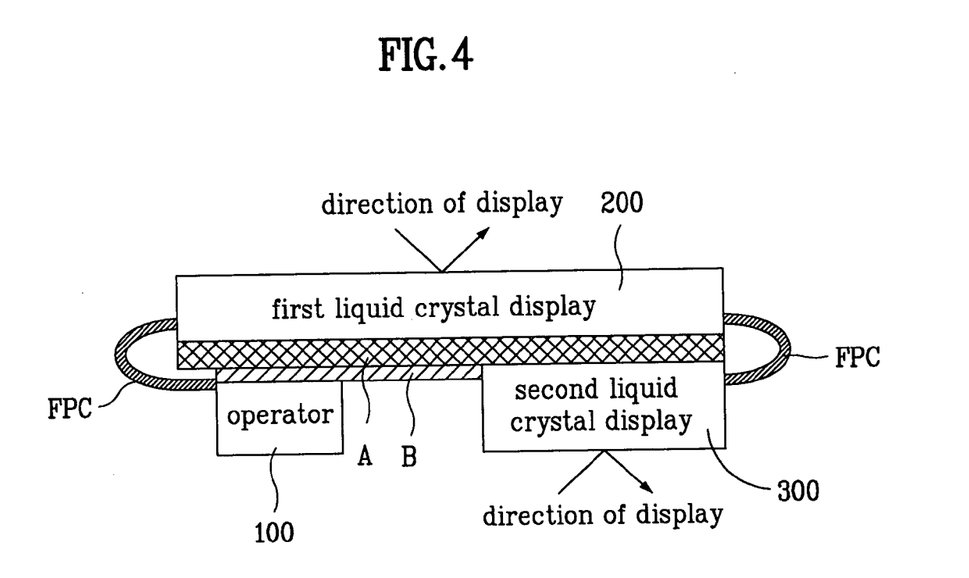
FIG. 4 illustrates a display in a mobile station in accordance with a first preferred embodiment.

An arrangement of the two faced display of the first and second LCDs 200 and 300 by one operator 100 is as follows. FIG. 4 illustrates a display in a mobile station in accordance with a first preferred embodiment.

There is a light plate 'A' disposed in the middle for stable dispersion of a light from a light source when a back light is illuminated, to provide a uniform back light, there is the aforementioned first LCD 200 on an upper surface of the light plate 'A', and there is the aforementioned second LCD 300 on a back surface of the light plate 'A'. Therefore, the light plate 'A' supplies the light source of back lighting both to the first LCD 200 and the second LCD 300, and the first LCD 200 and the second LCD 300 have opposite directions of display. The light plate 'A' has a size equal to an area of the first LCD 200, and there is a light shielding film 'B' on a remainder of the back surface where the second LCD 300 is not disposed for preventing loss of light from the light source as well as cutting off an infiltration of an external light because a size of the second LCD 300 is smaller than a size of the first LCD 200. And, there is an operator 100 on the light shielding film 'B', and there is a signal line connected through a FPC (Flexible wire) between the operator 100 and the first LCD 200, and there is also a signal line through a FPC between the first LCD 200 and the second LCD 300.

Figure 5:
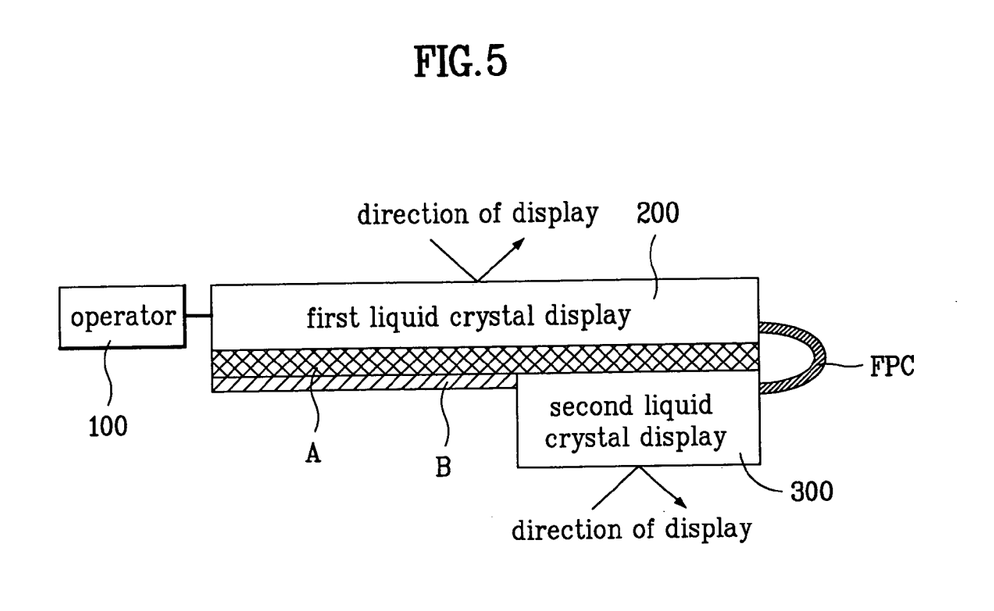
FIG. 5 illustrates a display in a mobile station in accordance with a second preferred embodiment.

FIG. 5 illustrates a display in a mobile station in accordance with a second preferred embodiment.

The display in a mobile station in accordance with a second preferred embodiment has an operator 100 built in a folding cover. That is, first and second LCDs 200 and 300, a light plate 'A', and a light shielding film 'B' are disposed the same as shown in FIG. 4, only the operator 100 is built in a folding cover body through a FPC (Flexible wire). When the display having the first and second LCDs is mounted on a folder of a mobile station, the first LCD 200, the main screen, is fixed to an inside surface of the folder, and a window is formed in a portion of the folder corresponding to a portion of the second LCD 300, so that the second LCD 300 displays to the outside of the folder, as shown in FIGS. 7 and 8.

Figure 7:
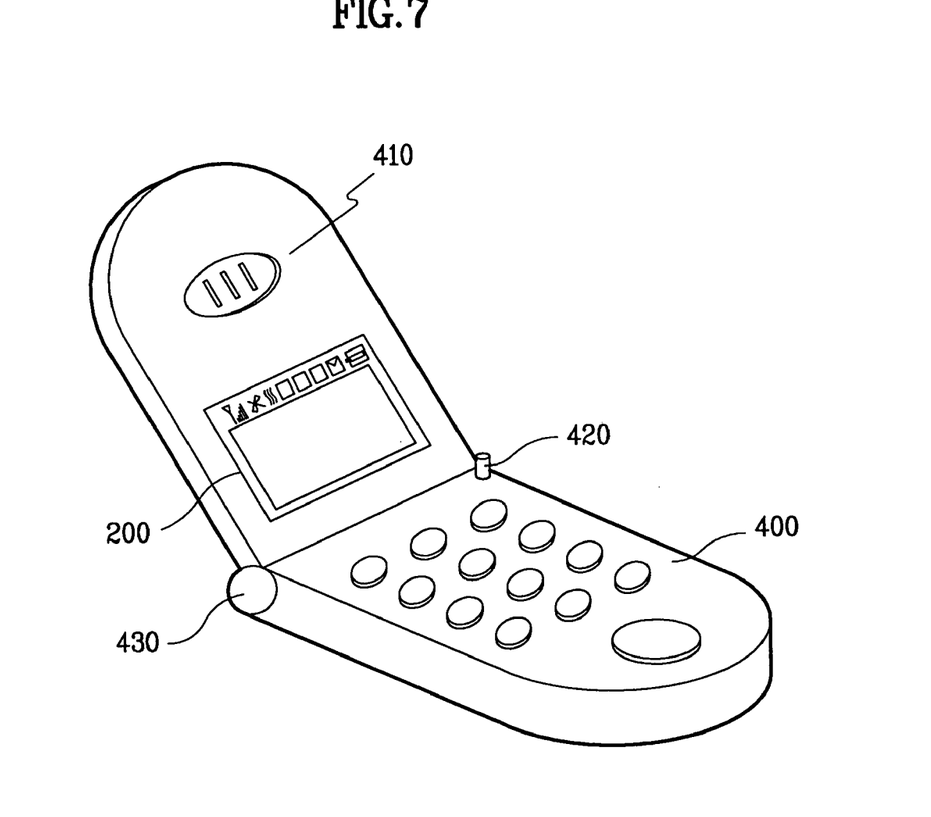
FIG. 7 illustrates a perspective view of a display in a mobile station with a folder opened in accordance with a preferred embodiment.
Figure 8:
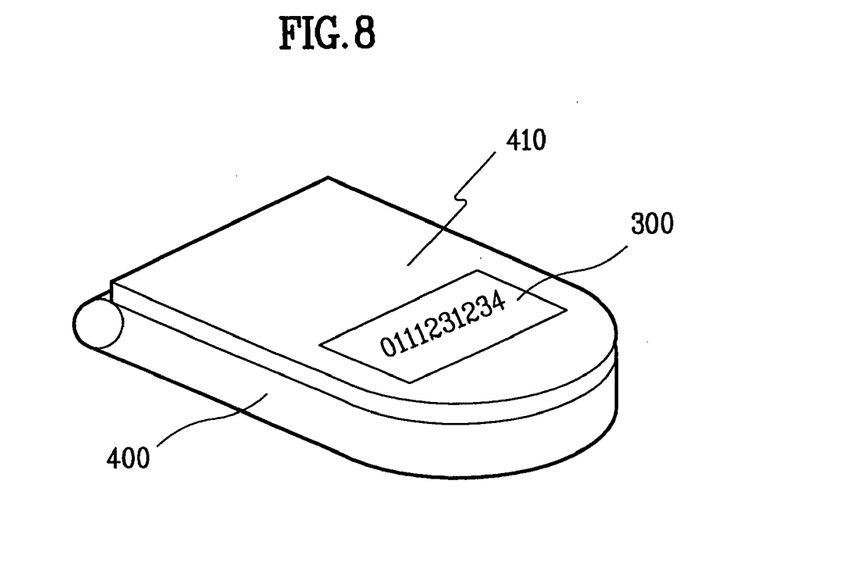
FIG. 8 illustrates a perspective view of a display in a mobile station with a folder closed in accordance with a preferred embodiment; and, FIG. 9 illustrates a flow chart showing the steps of a method for operating a display in a mobile station in accordance with a preferred embodiment.

FIG. 7 illustrates a perspective view of a display in a mobile station with a folder opened in accordance with a preferred embodiment of the present invention, and FIG. 8 illustrates a perspective view of a display in a mobile station with a folder closed in accordance with a preferred embodiment.

Referring to FIG. 7, a mobile station includes a body 400, a folding cover 410, and a hinge 430 for coupling the body 400 and the folding cover 410. And, the body 400 has a switch 420 for sensing opening and closing of the folding cover 410, and the folding cover 410 has the first LCD 200 on an inside thereof, and the second LCD 300 on an outside thereof.

Figure 6:
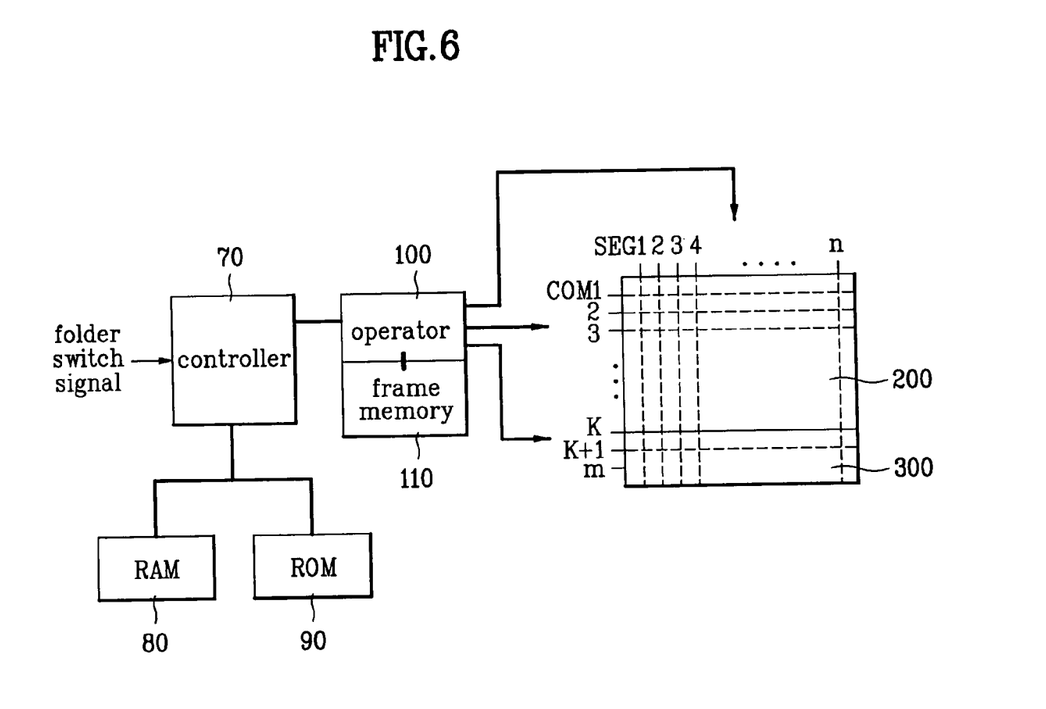
FIG. 6 illustrates operation of a display in a mobile station in accordance with a preferred embodiment.

Operation of a system including the first LCD 200 9a main screen), the second LCD 300 (a supplementary screen), and the operator 100 for operating the first and second LCDs 200 and 300, for displaying numerals, characters, or figures or graphics will be explained. FIG. 6 illustrates operation of a display in a mobile station in accordance with a preferred embodiment.

Referring to FIG. 6, a display in a mobile station for operating two LCDs by one operator includes a controller 70, a RAM 80, a ROM 90, an operator 100, and a frame memory 110. The controller 70 controls overall display operation of the first and second LCDs 200 and 300, and, particularly, as can be known from FIG. 7, the controller 70 activates the first LCD 200 mounted on an inside surface of the folding cover 410 according to a signal of the switch 420 switched as the folding cover 410 is opened/closed, or as can be seen from FIG. 8, activates the second LCD 300 mounted on an outside of the folding cover 410 which provides brief information, such as information on an originating station, name, information on the present time, and the like on reception of a signal. The RAM 80 stores a signal provided to a volatile memory temporarily, or a booted data, for accelerating operation of the controller, and the ROM 90 is a nonvolatile memory for storing a general management algorithm for the controller 70 therein. The operator 100 controls operation of a plurality of signal lines $SEG_1-SEG_n$, and a plurality of scan lines $COM_1-COM_m$ for selective operation of the first and second LCDs 200 and 300 respectively mounted on inside/outside surfaces of the folding cover 410 in response to a control signal provided from the controller 70 for displaying characters, numerals, or graphics of figures. The frame memory 110 processes a signal provided for controlling display in frame units for maintaining a stable display of the characters, numerals, or figures.

Figure 9:
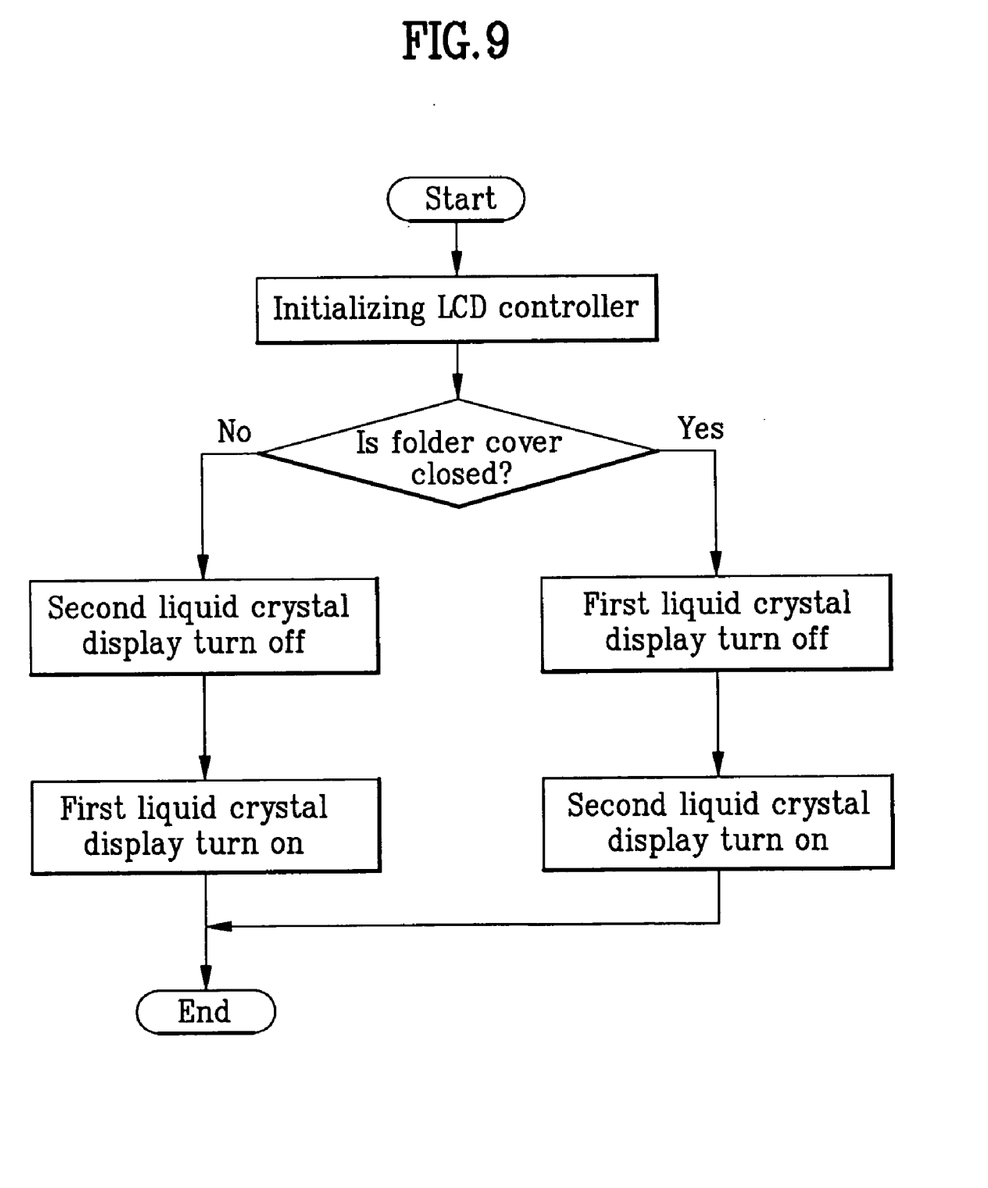

A display method following opening and closing of the folder in a mobile station of the present invention having the aforementioned system will be explained. FIG. 9 illustrates a flow chart showing the steps of a method for operating a display in a mobile station in accordance with a preferred embodiment.

First, a case when the display of the mobile station has a system as shown in FIG. 3 will be explained. When power is supplied to a folder type mobile station, the controller 70 is initialized according to the algorithm and the management program stored in the RAM 80 and in the ROM 90, and upon completion of an initialization booting, the step proceeds to a standby mode for analyzing a signal from the switch 420 switched according to opening and closing of the folding cover 410 centered on the hinge 430. If the signal from the switch 420 is analyzed in the above step indicates that the folding cover 410 is closed, the controller 70 determines that the mobile station is in a mode for displaying the present time, and information on a status of the mobile station through the second LCD 300, a supplementary screen, provided on an outside of the folding cover 410, and provides a control signal pertinent to the mode to the operator 100. Then, the operator 100 displays the information on a state of the mobile station, and information on the present time on the second LCD 300 mounted on an outside of the folding cover 410 in response to the control signal. That is, a frame signal for implementing display stored in the frame memory 110 is read, and only first to 'n'th signal lines $SEG_1-SEG_n$ and 'k+1'th to 'm' th scan lines $COM_1-COM_m$ are controlled, for displaying the information on the second LCD 300.

In a state that general information on the mobile station is displayed on the second LCD 300, a supplementary screen, formed on outside of the folding cover 410, if the signal from the switch 420 indicates that the folding cover 410 is opened, then the controller 70 provides a control signal to the operator 100 for executing change over of the display of the state information from the second LCD 300 to the first LCD 200. Accordingly, the operator cuts off the display on the second LCD 300, and displays the general information through the first LCD 200. That is, a frame information on implementation of display stored in the frame memory 110 is read, and only first to 'n'th signal lines $SEG_1$–$SEG_n$ and first to 'k' th scan lines $COM_1$–$COM_k$ are operated, for displaying the information on the first LCD 200. And, under a state in which the folding cover is closed only to display general status information through the second LCD 300, if a call is detected through a base station relay, the controller 70 analyses information on the originating station included in the call, and displays an originating call number on the second LCD 300. Accordingly, the subscriber can select connection to the call depending on the information on the displayed originating station, and a received message in characters or a call message can be recognized, conveniently.

As has been explained, the mobile station and the display therein disclosed herein have the following advantages.

First, the mobile station and the display therein is convenient to use because general operation status, such as recognition of information on an originating station for a call, reception of a message in characters, and time information, can be displayed on an LCD mounted on an outside of a folder by providing LCDs on inside and outside of a folder and operating means for operating the LCDs.

Second, the control of two LCDs by one operator, and the provision of back lights by one light plate permits a reduction of power consumption, and to prolong a time period a mobile station can remain operative from a single charge.

Third, the control of two LCDs by one operator, and the provision of back lights by one light plate permit an effective use of a limited space in the system, thereby permitting fabrication of a light weight and slim mobile station.

Fourth, since general operation status, such as recognition of information on an originating station for the call, reception of a message in characters, and time information, is displayed on the LCD mounted on an outside of the folder, the number of openings and closings of the folding cover, unnecessary power consumption caused by opening and closing of the folding cover can be reduced, such as back light illumination, can be eliminated, that can prolong an lifetime of the battery.

It will be apparent to those skilled in the art that various modifications and variations can be made in the mobile station and the display therein of the present invention without departing from the spirit or scope of the invention. Thus, it is intended that the present invention cover the modifications and variations of this invention provided they come within the scope of the appended claims and their equivalents.

What is claimed is:

1. A mobile station comprising:
   a folding cover movable between an open position and a closed position;
   a first display means mounted on a first side of the folding cover having 'n' first signal lines and 'k' scan lines;
   second display means mounted on a second side of the folding cover having 'n' second signal lines and 'm–k' scan lines wherein each of the 'n' second signal lines is electrically connected to a respective one of the 'n' first signal lines;
   a single operator for operating the first and second display means having 'm' scan electrode lines connecting the 'k' scan lines in the first display means and the 'm–k' scan lines in the second display means, and 'n' third signal electrode lines connected to the first signal lines; and
   a controller for providing a control signal to the operator for controlling the first and second display means, the controller enabling the first display means when the folding cover is in the open position and the controller enabling the second display means when the folding cover is in the closed position.

2. The mobile station as claimed in claim 1, further comprising a switch, the switch being in a first position when the folding cover is in the open position, and the switching being in a second position when the folding cover is in the closed position.

3. The mobile station as claimed in claim 2, wherein the controller receives a display selection signal from the switch, and in response thereto, enables one of the first and second display means, and disables the other one of the first and second display means.

4. A mobile station comprising:
   a folding cover movable between an open position and a closed position;
   a first display means mounted on a first side of the folding cover having 'n' first scan lines and 'k' signal lines;
   second display means mounted on a second side of the folding cover having 'n' second scan lines and 'm–k' signal lines, wherein each of the 'n' second scan lines is electrically connected to a respective one of the 'n' first scan lines;
   a single operator for operating the first and second display means having 'm' signal electrode lines connecting the 'k' signal lines in the first display means and the 'm–k' signal lines in the second display means, and 'n' third scan electrode lines connected to the first scan lines; and
   a controller for providing a control signal to the operator for controlling the first and second display means, the controller enabling the first display means when the folding cover is in the open position and the controller enabling the second display means when the folding cover is in the closed position.

5. The mobile station as claimed in claim 4, further comprising a switch, the switch being in a first position when the folding cover is in the open position, and the switch being in a second position when the folding cover is in the closed position.

6. The mobile station as claimed in claim 5, wherein the controller receives a display selection signal from the switch, and in response thereto, enables one of the first and second display means, and disables the other one of the first and second display means.

7. A mobile station having a display, the mobile station comprising:
   a folding cover movable between an open position and a closed position;
   a first liquid crystal display having a plurality of first signal lines and a plurality of first scan lines defining a plurality of first pixels, the first liquid crystal display being positioned on a first side of the folding cover;
   a second liquid crystal display having a plurality of second signal lines and a plurality of second scan lines defining a plurality of second pixels, the second liquid crystal display being positioned on a second side of the folding cover, the second side being opposite to the first side, each of the second scan lines electrically connected to a respective one of the first scan lines; and a single operator for operating the first and second liquid crystal displays having a plurality of scan electrode lines connected to the first scan lines, and a plurality of signal electrode lines connected to the first signal lines and the second signal lines.

8. The display as claimed in claim 7, further comprising a controller for providing a control signal to the operator for controlling the first and second liquid crystal displays.

9. The display as claimed in claim 7, further comprising a common light plate for illuminating the first and second liquid crystal displays.

10. The display as claimed in claim 9, wherein the first and second liquid crystal displays are located on opposite sides of the common light plate.

11. The display as claimed in claim 10, wherein the operator is located on the same side of the common light plane as one of the first and second liquid crystal displays.

12. The display as claimed in claim 7, further comprising flexible wire connecting the plurality of signal electrode lines and the plurality of scan electrode lines.

13. The display as claimed in claim 7, wherein the plurality of signal electrode lines include;
a plurality of first signal electrode lines connecting the operator to a plurality of first signal lines in the first liquid crystal display, and
a plurality of second signal electrode lines connecting the plurality of first signal lines and the plurality of second signal lines in the second liquid crystal display.

14. A mobile station having a display, the mobile station comprising:
a folding cover movable between an open position and a closed position;
a first liquid crystal display having a plurality of first signal lines and a plurality of first scan lines defining a plurality of first pixels, the first liquid crystal display being positioned on a first side of the folding cover;
a second liquid crystal display having a plurality of second signal lines and a plurality of second scan lines defining a plurality of second pixels, the second liquid crystal display being positioned on a second side of the folding cover, the second side being opposite to the first side, each of the second signal lines electrically connected to a respective one of the first signal lines; and
a single operator for operating the first and second liquid crystal displays having a plurality of signal electrode lines connected to the first signal lines, and a plurality of scan electrode lines connected to the first scan lines and the second scan lines.

15. The display as claimed in claim 14, further comprising a controller for providing a control signal to the operator for controlling the first and second liquid crystal displays.

16. The display as claimed in claim 14, further comprising a common light plate for illuminating the first and second liquid crystal displays.

17. The display as claimed in claim 16, wherein the first and second liquid crystal displays are located on opposite sides of the common light plate.

18. The display as claimed in claim 17, wherein the operator is located on the same side of the common light plane as one of the first and second liquid crystal displays.

19. The display as claimed in claim 14, further comprising flexible wire connecting the plurality of signal electrode lines and the plurality of scan electrode lines.

20. The display as claimed in claim 14, wherein the plurality of scan electrode lines include;
a plurality of first scan electrode lines connecting the operator to a plurality of first scan lines in the first liquid crystal display, and
a plurality of second scan electrode lines connecting the plurality of first scan lines and the plurality of second scan lines in the second liquid crystal display.

21. A mobile station having a body, the mobile station comprising:
a folding cover coupled to the body, the folding cover movable between an open position and a closed position;
a first display device on a first side of the folding cover, the first display device having 'n' first signal lines and 'k' first scan lines;
a second display device on a second side of the folding cover, the second display device having 'n' second signal lines and 'm–k' second scan lines, wherein each of the 'n' second signal electrodes is electrically connected to a respective one of the 'n' first signal lines and the second side is opposite to the first side;
a single operator for operating the first and second display devices, the single operator having 'n' signal electrode lines connected to the 'n' first signal lines, and having 'm' scan electrode lines connected to the 'k' first scan lines and the 'm–k' second scan lines; and
a controller for providing a control signal to the operator for controlling the first and second display devices, the controller enabling the first display device when the folding cover is in the open position and the controller enabling the second display device when the folding is in the closed position.

22. The mobile station as claimed in claim 21, further comprising a common light plate for illuminating the first and second display devices.

23. The mobile station as claimed in claim 22, wherein the first and second display devices are located on opposite sides of the common light plate.

24. The mobile station as claimed in claim 23, wherein the operator is located on the same side of the common light plane as one of the first and second display devices.

25. The mobile station as claimed in claim 21, further comprising a flexible wire electrically connecting the operator to the first display device.

26. The mobile station as claimed in claim 21, further comprising a flexible wire electrically connecting the first display device to the second display device.

27. A mobile communication device comprising:
a cover associated with a body of the mobile communication device;
a first display corresponding to a top side of the cover;
a second display corresponding to a bottom side of the cover;
an operator configured to operate the first and second displays, the operator having 'n' signal lines and 'm' scan electrode lines, wherein the same 'n' signal lines are configured to operate and communicate with the first and second displays, the 'k' scan lines are connected to the first display, and the 'm–k' scan lines are connected to the second display; and
a controller configured to transmit a control signal to the operator to control the first and second display devices, the controller being configured to enable the first display when the first display is viewable and to enable the second display when the second display is viewable, the controller enabling the first and second displays in accordance with a switch.

* * * * *